Oct. 6, 1970 J. L. BARCUS ET AL 3,532,346

RANDOM PLAYBACK MECHANISM FOR A PHONOGRAPH

Filed Dec. 9, 1968

4 Sheets-Sheet 1

INVENTORS
JACK L. BARCUS
JAMES E. MARSHALL

BY Max E. Shirk
ATTORNEY

RANDOM PLAYBACK MECHANISM FOR A PHONOGRAPH

Filed Dec. 9, 1968 4 Sheets-Sheet 2

INVENTORS
JACK L. BARCUS
JAMES E. MARSHALL
BY Max E. Shirk
ATTORNEY

RANDOM PLAYBACK MECHANISM FOR A PHONOGRAPH

INVENTORS
JACK L. BARCUS
JAMES E. MARSHALL
BY Max E. Shirk
ATTORNEY

RANDOM PLAYBACK MECHANISM FOR A PHONOGRAPH

INVENTORS
JACK L. BARCUS
JAMES E. MARSHALL
BY Max E. Shirk
ATTORNEY 3,532,346

RANDOM PLAYBACK MECHANISM FOR A PHONOGRAPH

Jack L. Barcus, Palos Verdes Peninsula, and James E. Marshall, Westminster, Calif., assignors to Mattel, Inc., Hawthorne, Calif., a corporation of Delaware Filed Dec. 9, 1968, Ser. No. 782,265
Int. Cl. G11b *25/04*
U.S. Cl. 274—1 6 Claims

ABSTRACT OF THE DISCLOSURE

A mechanism useful in toy phonographs to provide a random selection of record tracks comprising a multiface cam which stops the tone arm as it moves toward the perimeter of the record, to allow the needle on the arm to drop into one of the several record tracks. The cam is mounted for rotation by the record as it plays, so that the face which abuts the tone arm at successive outer movements thereof is randomly selected.

BACKGROUND OF THE INVENTION

Field of the invention

This invention relates to toy sound reproducing apparatus which can reproduce any of a number of different sound recordings.

Description of the prior art

Dolls and other toys are sometimes equipped with sound reproducing devices for playing short sayings. A typical device includes a disc record with several parallel grooves extending in a spiral, and a needle which can engage any one of the grooves to reproduce the saying recorded therein. The disc is mounted on a turntable that is powered by a spring. A cord wrapped about the turntable can be pulled by a child to wind the spring.

In order to move the tone arm to the perimeter of the record before each playing, the apparatus is constructed so that the cord extends through a hole in the tone arm. When the cord is pulled the tone arm is dragged outwardly until it hits a stop near the rim of the record. If the stop is always in the same place, the tone arm needle will always fall in the same groove. However, if the stop position can be adjusted before or at each spring winding in a random manner, the needle can play the sayings in a random sequence. The entertainment provided by the toy is enhanced by the automatic playing of different sayings and by the element of surprise resulting from the random manner of selection of sayings.

One device for the random positioning of a toy phonograph tone arm is described in patent application S.N. 769,888 by Jack L. Barcus filed Oct. 23, 1968, assigned to the same assignee as the present application, and hereby incorporated by reference. That application described a cam mounted on the drawstring or cord for stopping the tone arm, the cam being positioned for random rotation on the cord to stop the tone arm at a randomly selected position. Other types of random stopping mechanisms could be employed in toy phonographs.

OBJECTS AND SUMMARY OF THE INVENTION

An object of the present invention is to provide a sound reproducing device with simple and efficient means for selecting particular recordings.

Another object is to provide simple means for randomly selecting one of several recordings on a record.

In accordance with the present invention, a sound reproducing device is provided of a type suitable for mounting in a toy, which includes apparatus for randomly positioning a tone arm over a record with several record tracks therein. The apparatus includes a cam with different face portions, each face portion tending to urge the tone arm into engagement with a particular record track. The cam is mounted for random rotation, and the portion which faces the tone arm depends upon the position at which the cam happens to stop rotating. Thus, the sequence of record tracks to be played is selected in a random manner.

In one embodiment of the invention, for use with a disc-like record mounted on a turntable, the cam has a circular portion which can engage the rim of the record to cause rapid rotation of the cam, and a multiface portion for engaging the tone arm. Each time the record is played, the tone arm moves away from the cam while the record turns, thereby allowing the cam to rotate rapidly and stop in an unpredictable rotational position. Thus, a different one of its many faces is positioned to stop the tone arm the next time the tone arm is moved to the rim of the record.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2:
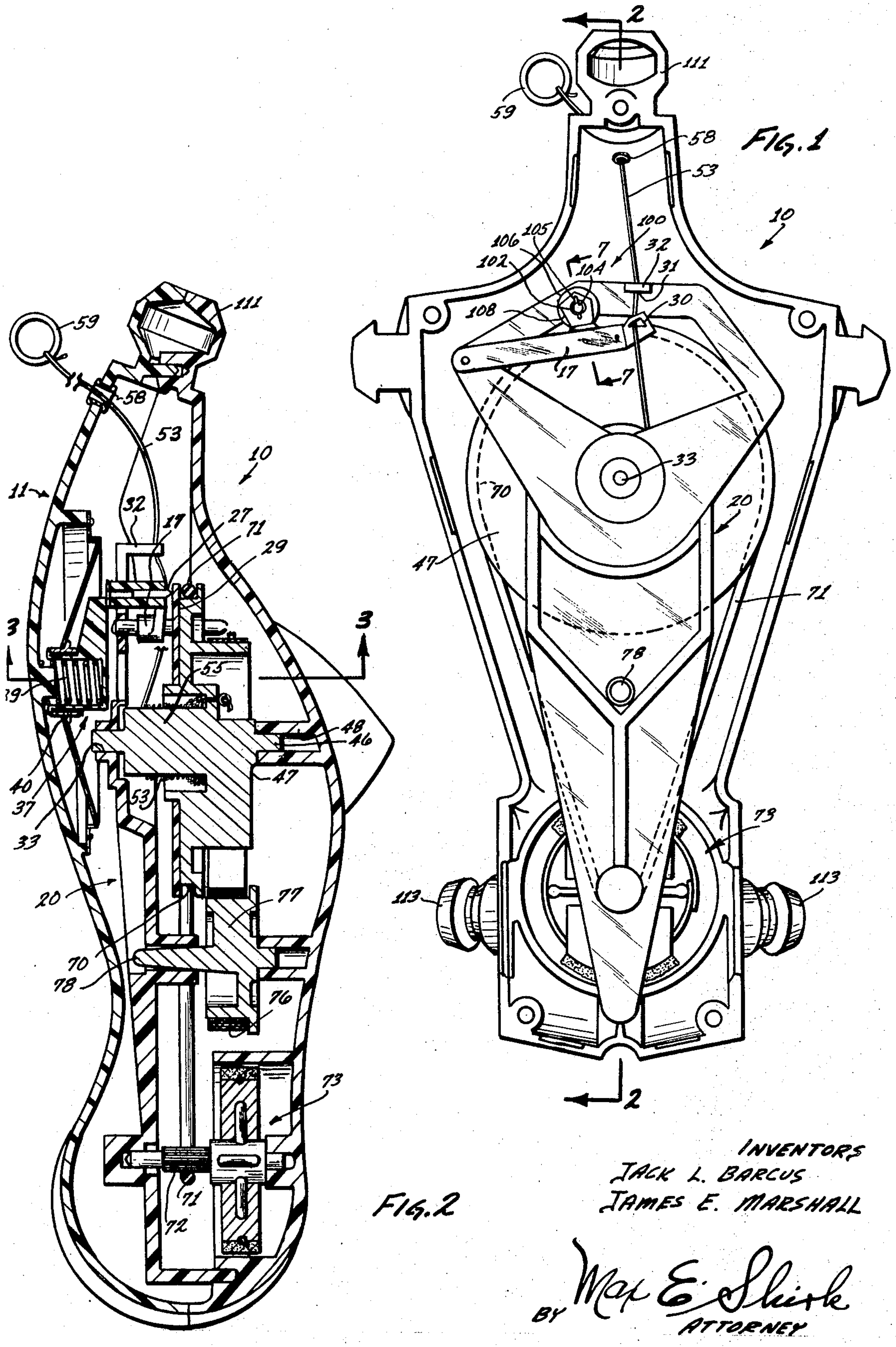
FIG. 1 is a plan view of the toy of the present invention, with a top cover thereof removed.
FIG. 2 is a sectional view taken on the line 2—2 of FIG. 1.
Figure 7:
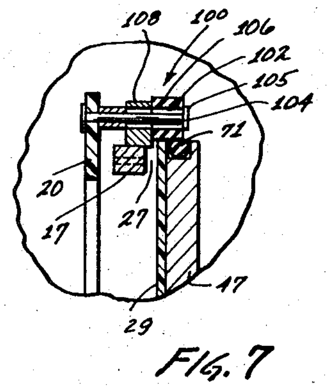
FIG. 7 is a sectional view taken on the line 7–7 of FIG. 1.
Figures 3, 4:
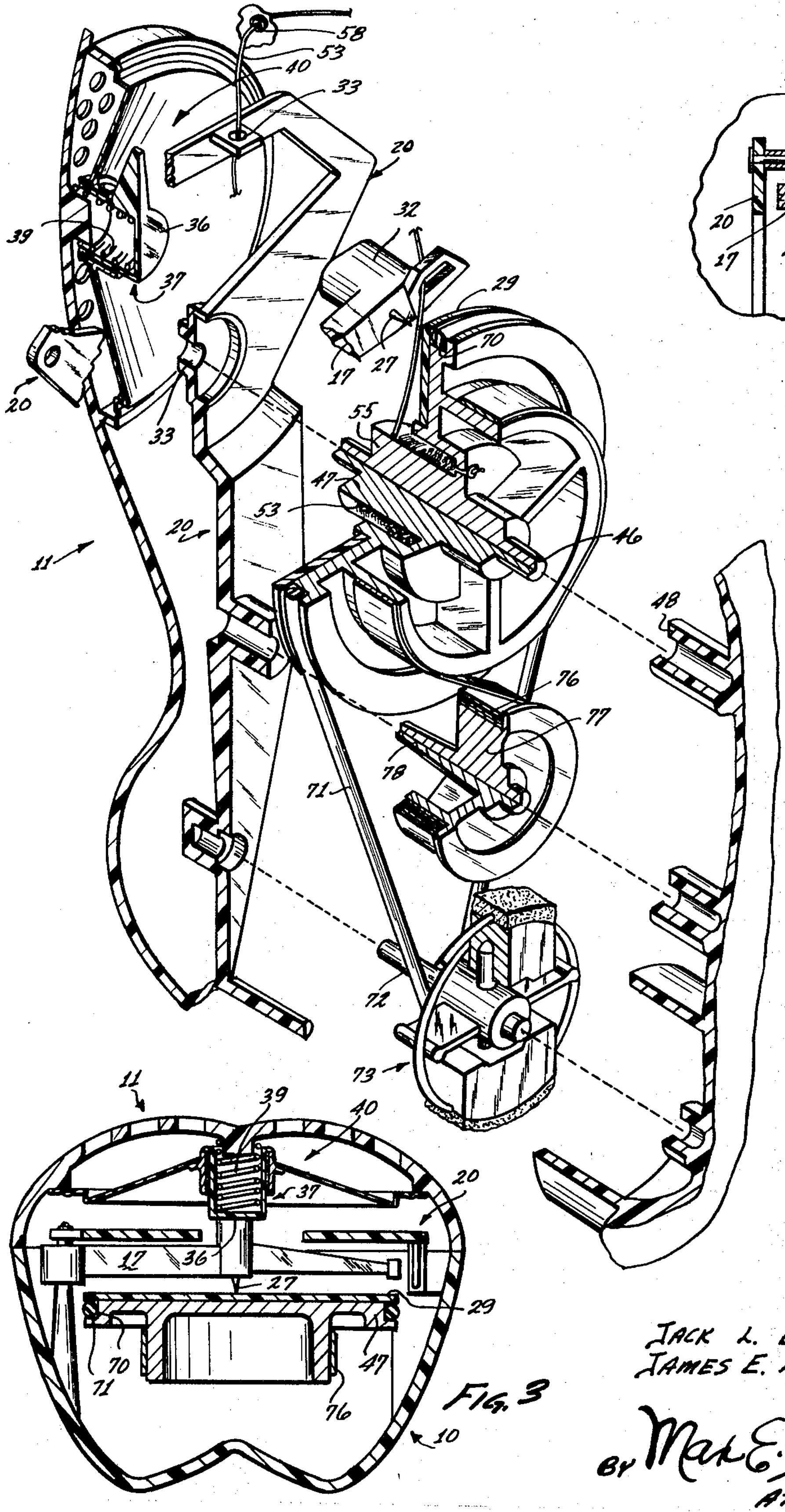
FIG. 3 is a sectional view taken on the line 3–3 of FIG. 2.
FIG. 4 is an exploded view of the toy of FIG. 1 with portions cut away.

FIGS. 1 through 4 show the front portion 10 and rear portion 11 of a doll housing which contains a toy phonograph constructed in accordance with the invention. The phonograph includes a record portion 29 formed in a rotor or turntable 47, the record having several parallel, spiral record grooves therein that define different sound recordings or sayings. A tone arm 17 has a stylus or needle 27 engaged with one of the lateral grooves to play the record. The tone arm bears against an armature 37 of a speaker cone assembly 40 that acoustically amplifies the sound, a spring 39 of the speaker cone assembly urging the armature thereagainst.

The turntable 47 is fixed to a spindle 46 that is rotably engaged at one end with a doll housing bearing 48, and the other end with a bearing 33, in a frame member 20. Power for rotating the turntable during playing is provided by a negator spring 76. The spring can be wound onto and off from a drum 77 that has a shaft 78 rotably engaged with bearings on the doll housing and frame member. Prior to playing the record, the spring must be wound off the drum and around a skirt 62 of the turntable. The spring then rotates the turntable in the opposite direction to play the record while the spring is rewound on the drum 77. The speed of the turntable is regulated by a governor 73 which is driven by a belt 71 that extends around a knurled governor spindle 72 and around an annular pulley groove 70 formed in the turntable 47.

The winding of the spring on the turntable is accomplished when a child pulls on the pull ring 59 at the outer end of a cord 53. The inner end of the cord has many turns around a drum portion 55 of the turntable when the phonograph is unwound. Pulling on the cord pull ring turns the turntable to unwind the cord therefrom and to wind the spring thereon. The cord extends through an aperture 30 in the tone arm 17, to move the tone arm and the stylus thereon to the outer edge of the record as the string is pulled. Thus, the stylus is automatically moved outward to the beginning of a groove when the toy is wound. The cord also extends through a hole 31 in a boss 32 on the frame member 20, and through an opening 58 in the doll housing. As soon as the child has pulled the cord, he releases it to allow the spring to turn the turntable and play the record.

The tone arm aperture 30 is considerably larger than the cord 53 to facilitate cord movement therethrough, although there is some friction between them. The hole 31 in the boss 32 is at a high enough level above the record that when the cord is pulled taut, the tone arm is lifted off the record. Cord friction with the walls of the tone arm aperture 30 then allows the cord to carry the tone arm outwardly or laterally to the rim of the record. A cam 100 constructed in accordance with the invention, and to be described in betail below, limits outward or lateral movement of the tone arm. When the child releases the cord, cord tension is very low, and the tone are moves against the record under the force of the spring 39 in the armature of the speaker cone. The tone arm then reproduces the sounds defined by the groove into which its stylus has fallen.

Figures 5, 6:
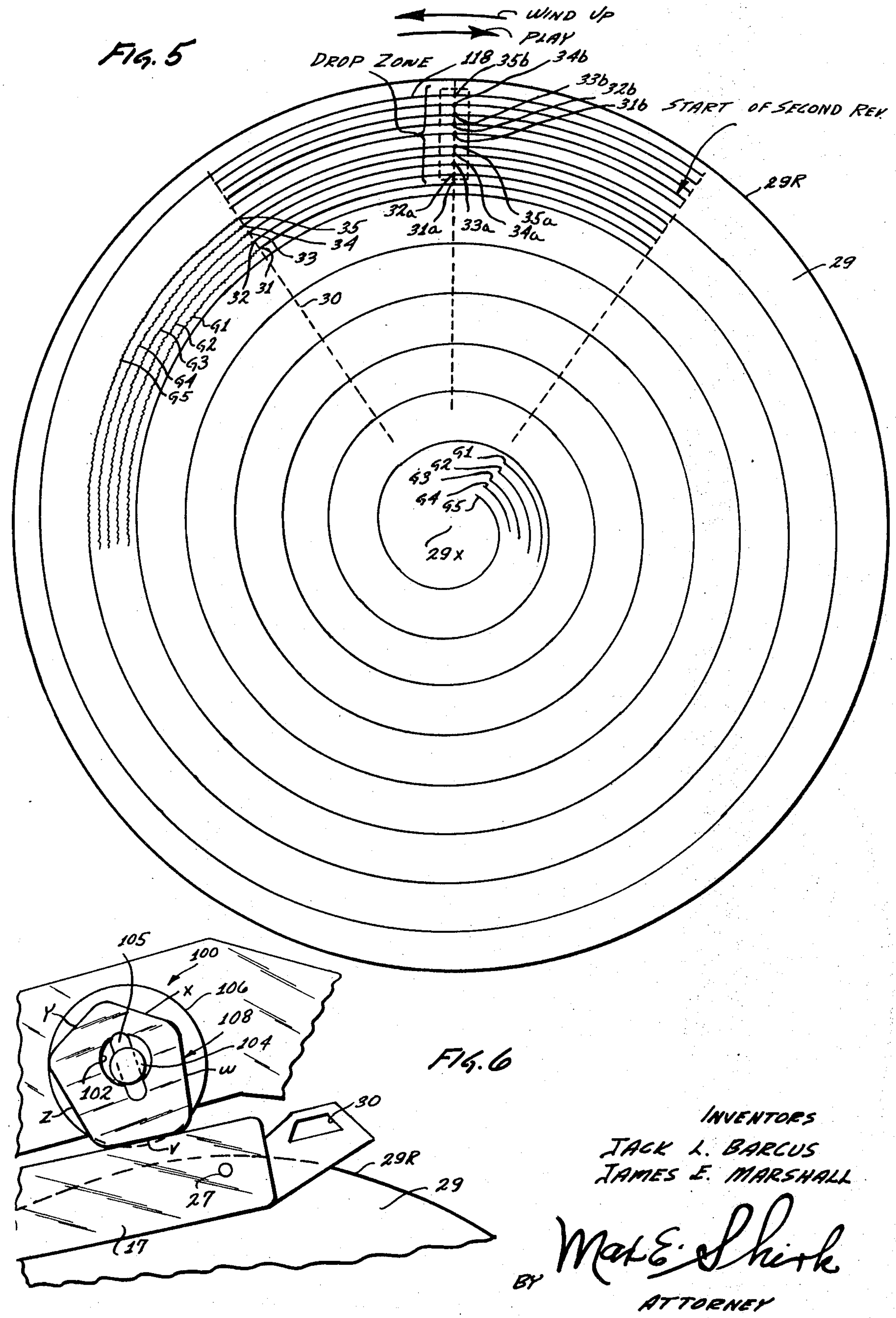
FIG. 5 is a plan view of a record constructed in accordance with the present invention.
FIG. 6 is an enlarged view of the cam apparatus of the invention.

The particular groove which is engaged depends upon the radial position at which the cam 100 stops the tone arm to establish the initial tone arm position. A better understanding of the relationship of initial tone arm position and the particular recording which will be played can be had by considering the construction of the record, as shown in FIG. 5. This figure illustrates the surface of record 29, which defines a plurality of discrete, separate spiral or multi-convolution grooves. The grooves extend parallel to each other, and are laterally spaced from one another (along a radial line), and they move substantially parallel to their length when the record rotates.

The number of grooves, designated G1–G5 is limited to five in FIG. 5, for explanatory purposes only, and only groove G5 is shown in its entirety. Each groove is sound modulated, as represented by the wavy lines (the modulation can also be in groove depth). Thus, each groove stores a specific sequence of sounds sometimes referred to as sayings, which are reproducible by the tone arm stylus or needle 27.

As the record 29 rotates, which is typically in direction of an arrow labeled PLAY, the stylus follows the groove radially inwardly toward center 29*x* of record 29. The convolution of each groove closest to the center may be defined as the inner convolution, while the convolution of each groove containing the start of a saying or the part preceding a saying may be thought of as the outer convolution. In FIG. 5, the start points of all the sayings in the five grooves G1-G5 are assumed to be aligned along a radial line 30, and are designated by numerals 31 through 35.

The grooves G1–G5 are discrete, rather than being parts of one continuous groove as is the case in a conventional record. Accordingly, after one of the sayings is reproduced and it is desired to reproduce another saying, it is necessary to engage the stylus with the outer convolution of a second groove at its saying start point. The circumferential position at which the stylus engages the record may be defined by the area labeled the DROP ZONE. This is the portion of the record under the stylus when the cord has been pulled until it is fully unwound from the turntable. When the child releases the cord pull ring, the stylus falls against the record somewhere in the DROP ZONE. In practice, the DROP ZONE may vary in size, depending upon the manner in which the child releases the cord.

In order to prevent the start of a sound reproduction in the middle of a saying, each groove includes a blank lead convolution portion which precedes the start of the saying. Thus, points 31*a*, 32*a*, 33*a*, 34*a*, and 35*a* which designate the radially innermost engagement points for grooves G1–G5 within the DROP ZONE, precede the start of the saying. It may be noted that a stylus may also engage the grooves at points 31*b*, 32*b*, 33*b*, 34*b*, and 35*b* within the DROP ZONE. The cam 100 determines to some extent which groove will be engaged.

In accordance with the present invention, random positioning means in the form of a cam 100, as best shown in FIGS. 1 and 6 is provided to control the radial position at which the tone arm is stopped, and thus, the particular groove to be engaged by the tone arm stylus. The cam has a bearing hole 102 for rotatably mounting it on a post 104 that is supported on the frame member 20. A retaining pin 105 prevents the cam from falling off the post. A circular portion 106 on the cam sometimes engages the rim 29R of the record portion of the turntable so that the cam may spin when the turntable turns. The cam also has a cam face portion 108 which contacts the tone arm.

The cam face portion 108 has five sections, *v*, *w*, *x*, *y* and *z* circumferentially spaced about the cam, each section being a different distance from the walls of the cam bearing hole 102. The tone arm 17 can abut any one of the cam face sections, depending upon the rotational position at which the cam comes to rest. Each cam face holds the tone arm so that the stylus 27 tends to initially engage or fall into a particular groove or the grooves on either side of it. When the tone arm abuts the cam, the cam is held away from the rim 29R of the record. However, the bearing hole 102 is large enough for appreciable lateral shifting of the cam (perpendicular to its axis of rotation) to allow the circular cam portion 106 to contact the record rim when the tone arm moves away from the cam.

Each time the child releases the cord after having pulled it, the cam portion 106 can move against the record rim for cam rotation. The cam 100 is moved by gravity against the record rim. To encourage the child to hold the doll so the cam can move against the record rim, the cam post 104 is mounted on the upper side of the record, that is, the side nearest the doll head which is mounted on 111, and which is opposite the doll legs that are mounted at 113. The cam does not have to be at the extreme upper side, but it should be above the axis of the turntable so it is at least partially pulled by gravity toward the record rim. Because of the small diameter of cam portion 106 which contacts the record rim, the cam rotates rapidly. This, combined with the variation in the period during which the cam contacts the record rim results in a random determination of the rotational position at which the cam comes to rest. Thus, the radial position at which the tone arm will be stopped, and therefore the saying to be played next, is randomly determined.

While a cam with several distinct faces is shown, a continuous cam face can be employed, so long as different portions of the face are different distances from the bearing hole 102. The cam can be rotated by any moving portion of the mechanism, the record rim serving as only one example of means for coupling the cam to the spring motor that rotates the record. The cam also could be spring biased or provided with a soft elastic surface to eliminate the reliance on gravity to move it against a moving element. It should also be noted that the cam is useful in a variety of sound reproducing machines, including those with band-like records instead of turntables.

Figures 8, 9:
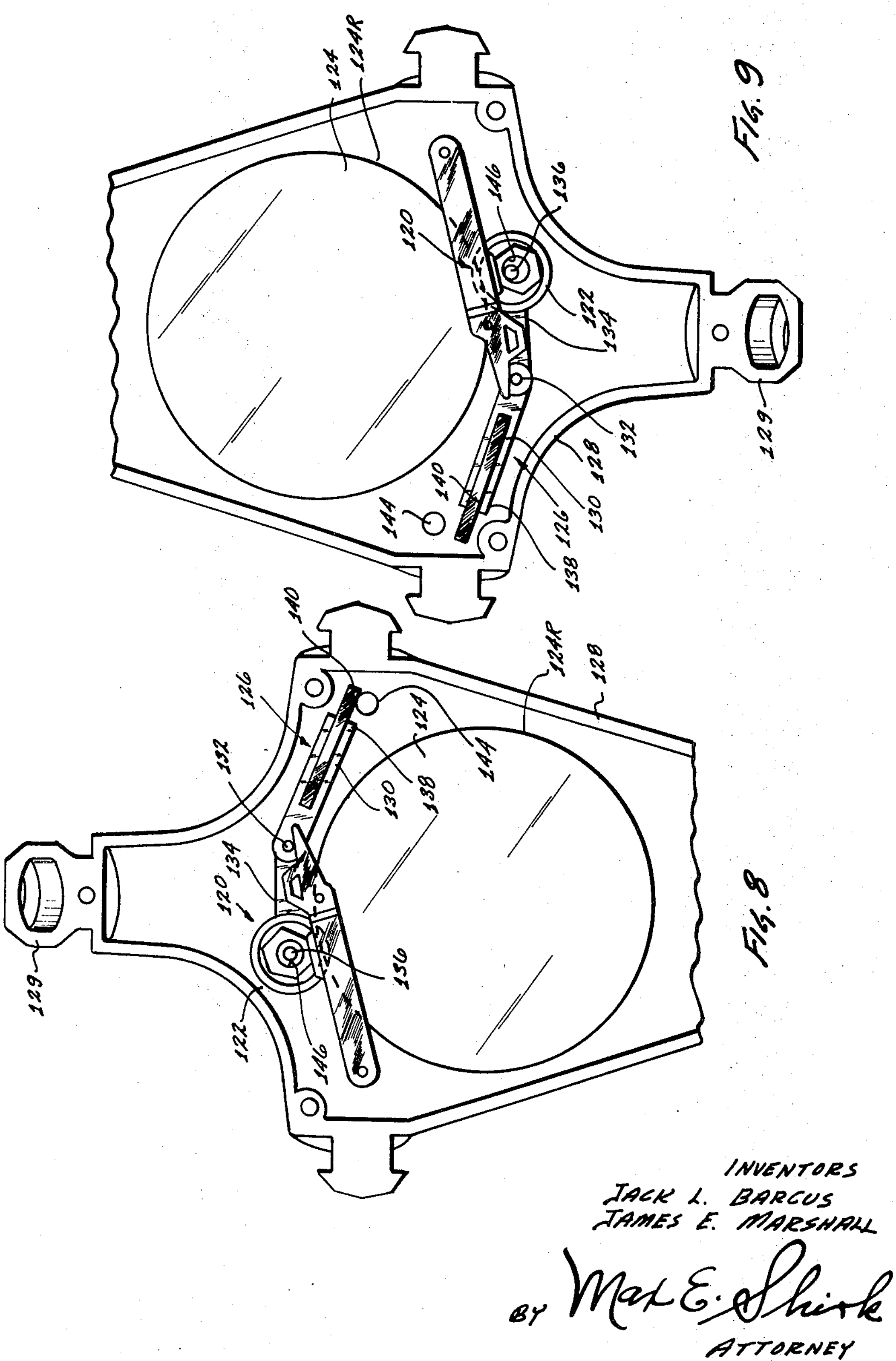
FIG. 8 is a partial plan view of a toy constructed in accordance with another embodiment of the invention, with the top cover thereof removed.
FIG. 9 is a view similar to that of FIG. 8, but wherein the toy is in an upside-down position.

FIG. 8 illustrates another embodiment of the invention which employs a cam 120 that is similar to that of the previously described embodiment, including a circular cam rim portion 122 for bearing against the rim of a record 124, so that the record rim 124R serves as a cam driving surface. However, this embodiment also includes a mechanism 126 for assuring engagement of the cam rim portion 122 with the record rim regardless of the orientation of the doll body 128. This is to assure cam rotation even if the doll is continually held upside down.

The mechanism 126 includes a lever 130 pivotally mounted at 132 on the doll body. One end 134 of the lever supports a post 136 on which the cam 120 is rotatably mounted. The other end 138 of the lever includes a weight 140, which is heavy enough so that the end 138 is always pulled down by gravity. However, a stop 144 on the doll body limits the amount of rotation of the lever in one direction of rotation.

When the doll body 128 is in the orientation of FIG. 8, with the portion 129 at which the doll head is mounted being uppermost, the lever weight 140 moves down until it abuts the stop 144. As a result, the other lever end 134 moves upward slightly, and so does the cam-holding post 136. However, the central bearing hole 146 in the cam is large enough, in relation to the amount of upward post movement, that it allows the cam rim portion 122 to still move against the rim of the record 124. That is, the looseness of rotational mounting allows sufficient movement (perpendicular to the axis of rotation) of the cam, to enable it to move against the record rim. Thus, in the rightside up position of FIG. 8, the cam 120 bears against the record rim, to present a new cam face to the tone arm 148 after every playing of the record.

When the doll body is turned upside down to the position of FIG. 9, the weight 140 moves down to pivot the lever 130 in the opposite direction. The end 134 of the lever is then raised, and its cam-holding post 136 is moved toward the record rim. The post engages the walls of the cam bearing hole 146, and presses the cam rim 122 against the rim of the record 124. When the record rotates at each playing, the cam 120 turns to present a randomly chosen face portion to the tone arm. Thus, this embodiment of the invention assures random record selection regardless of whether the doll is held rightside up or upside down. The cam rim 122 is also engaged with the record rim for almost any sideward orientation of the doll.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Sound reproducing apparatus comprising:
record means including a plurality of laterally adjacent record tracks defining different sound recordings;
record driving means;
tone arm means for engaging one of said record tracks to reproduce the sounds defined therein;

means for moving said tone arm means laterally across said record means;
a rotatable cam having a first portion provided with a plurality of cam face portions at different radial positions thereon for stopping said tone arm means at a plurality of different lateral positions to randomly engage it with different tracks;
means for rotatably supporting said cam for free spinning rotation at a position in the path of said tone arm means, to enable said cam to rotate about an axis substantially perpendicular to the direction of said lateral movement of said tone arm means;
said cam moving a circular portion axially spaced from said first portion for frictionally engaging said record driving means to spin said cam; and
means mounting said cam and record driving means for relative movement toward and from each other for engaging said circular portion with said record driving means to rotate said cam, and for disengaging said circular portion from said record driving means.

2. The apparatus described in claim 1 including:
a doll housing at least partially enclosing said record means, said doll housing having a normally upright position with upper and lower portions; and
cam rotating means movable with said record means; and wherein;
said means for rotatably supporting said cam being mounted in said housing on an upper side of said cam moving means for gravity-urging of said circular portion against said cam moving means, said cam being mounted in said housing for lateral shifting relative to said record means substantially perpendicular to its axis of rotation against and away from said cam moving means.

3. The apparatus described in claim 1 wherein:
said cam includes a bearing hole;
said means for rotatably supporting said cam comprises
a pivotally mounted lever having first and second ends on opposite sides of its axis of pivoting;
a post mounted on a first end of said lever, projecting loosely into said bearing hole to rotatably support said cam;
means for weighting said second end of said lever so it moves down under gravity force to raise up said first end; and
means for limiting the downward movement of said second end; and
said bearing hole being of sufficient diameter to permit said circular portion to engage said record means when said post is in a position furthest from said record means.

4. The apparatus described in claim 1 wherein:
said means for coupling said record moving means to said cam comprises means defining a cam driving surface that moves when said record means moves; and
said means for supporting said cam comprises
a lever,
means for pivotally mounting said lever adjacent said record means,
bearing means rotatably mounting said cam on said lever with a looseness to permit lateral movement of said cam by a predetermined distance,
weight means on said lever for urging it to pivot to move said bearing means toward said record means when said apparatus is in a first orientation, and
stop means for engaging said lever to limit the movement of said bearing means thereon away from said record means when said apparatus is in a second orientation which is upside down with respect to said first orientation, to enable said cam to move laterally into engagement with said record means.

5. Sound reproduction apparatus comprising:

record means having a plurality of tracks defining different sayings;
a turntable for rotating said record;
means selectively positionable to engage one of said tracks for reproducing the saying defined therein;
means for rotating said turntable relative to said means for reproducing;
rotatable cam means having a plurality of different face portions at different radial positions thereon, each face portion engageable with said means for reproducing to randomly direct it into engagement with a different track; and
said cam means comprising a cam member rotatably mounted adjacent to and movable toward and from said turntable and having a circular portion axially spaced from said face portions for frictional rotation by said turntable, said face portions of said cam member being disposed at different circumferential positions on said cam member.

6. Sound reproduction apparatus as defined in claim 5 wherein means rotatably supporting said cam comprises a pivot post adjacent said turntable and an axial opening through said cam, said post being smaller than said opening and extending therethrough whereby said cam can move laterally of said post, into and out of engagement with said turntable.

References Cited

UNITED STATES PATENTS

| | | |
|---|---|---|
| 3,211,460 | 10/1965 | Lea. |
| 3,282,588 | 11/1966 | Ashmele. |
| 3,282,590 | 11/1966 | Ashmele. |
| 3,389,915 | 6/1968 | Owen. |
| 3,410,564 | 11/1968 | Duncan. |
| 3,466,050 | 9/1969 | Sindlinger. |

LEONARD FORMAN, Primary Examiner

D. A. DEARING, Assistant Examiner

U.S. Cl. X.R.

274—9